United States Patent [19]

Chou et al.

[11] Patent Number: 5,520,874

[45] Date of Patent: May 28, 1996

[54] COMPRESSIBLE MOLD PLUNGER

[75] Inventors: C. H. Chou, Taipei; T. H. Wang, Taipei Hsien; C. S. Chen, Taipei Hsien; Y. C. Chen, Taipei Hsien; S. P. Ko, Taipei Hsien, all of Taiwan

[73] Assignee: Texas Instruments Incorporated, Dallas, Tex.

[21] Appl. No.: 314,997

[22] Filed: Sep. 29, 1994

[51] Int. Cl.⁶ .................................................. B29C 45/02
[52] U.S. Cl. ........................... 264/328.4; 264/328.19; 425/544; 425/588; 425/DIG. 228
[58] Field of Search .......................... 264/328.4, 328.19; 425/168, 544, 555, 583, 586, 588, DIG. 228

[56] References Cited

U.S. PATENT DOCUMENTS

| | | | |
|---|---|---|---|
| 2,351,582 | 6/1944 | Bohrer | 425/544 |
| 3,836,303 | 9/1974 | Horley | 425/544 |
| 4,723,899 | 2/1988 | Osada | 425/544 |
| 4,915,607 | 4/1990 | Medders et al. | 425/544 |

FOREIGN PATENT DOCUMENTS

| | | | |
|---|---|---|---|
| 60-88437 | 5/1985 | Japan | 425/544 |
| 2-50813 | 2/1990 | Japan | 425/544 |
| 588127 | 1/1978 | U.S.S.R. | 425/544 |

*Primary Examiner*—Jill L. Heitbrink
*Attorney, Agent, or Firm*—Alan K. Stewart; Richard L. Donaldson; William E. Hiller

[57] ABSTRACT

A plunger (22), used in a standard mold, has a movable piston (23) and spring (24) that reduce the cull space when piston (23) is pressed downward into the cull mold compound.

11 Claims, 4 Drawing Sheets

COMPRESSIBLE MOLD PLUNGER

FIELD OF THE INVENTION

This invention relates to molds for encapsulating devices, and more particularly to a compressible plunger for injecting mold compound into mold cavities.

BACKGROUND OF THE INVENTION

The transfer mold encapsulation process has been used with thermoset molding compounds, such as epoxy molding compounds, for about 30 years. Conventional transfer molds used in this process are typically high density molds with as few as 20 cavities to over 800 cavities per molded encapsulation shot. Both multi-plunger and single plunger systems are used.

Mold compound waste results from the cull of the compound that does not enter the mold cavity and stays in the mold pot and runner between the plunger and the mold cavity. Depending upon the mold design, this waste can amount to five to twenty-five percent of the compound used in one mold shot.

Attempts to solve the waste problem have included mold design changes, which can be expensive.

SUMMARY OF THE INVENTION

The invention relates to a molding apparatus, which includes: a molding compound pot for holding mold compound; a bushing in said molding pot; a runner connected to said mold pot for carrying mold compound to mold cavities; a plunger movably mounted in said bushing for forcing mold compound from said pot; and a piston mounted in said plunger, said piston movably mounted in a cavity in said plunger and is forced downward into the mold cull forcing the mold compound directly below the plunger into the runner.

The technical advance represented by the invention, as well as the objects thereof, will become apparent from the following description of a preferred embodiment of the invention when considered in conjunction with the accompanying drawings, and the novel features set forth in the appended claims.

DESCRIPTION OF A PREFERRED EMBODIMENT

Figure 1A:
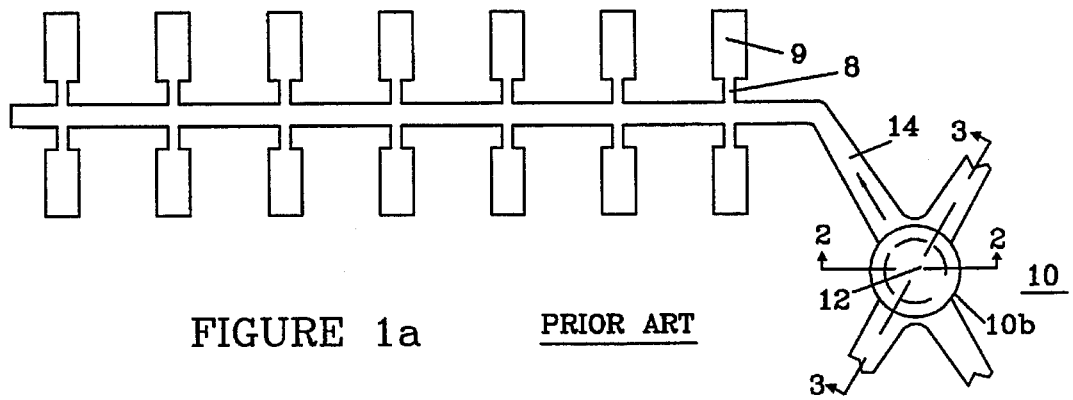
FIG. 1a shows a plunger connected to a runner and to mold cavities.

FIGS. 1a, 1b, 1c, 1d and 1e show a prior art molding apparatus. FIG. 1a schematically shows a lower transfer mold chase apparatus 10 for forcing mold compound from pot 10b via plunger 12 into runner 14 connected between the plunger 12 (shown in dashed line), gates 8 and the mold cavities 9.

Figures 1B, 1C:
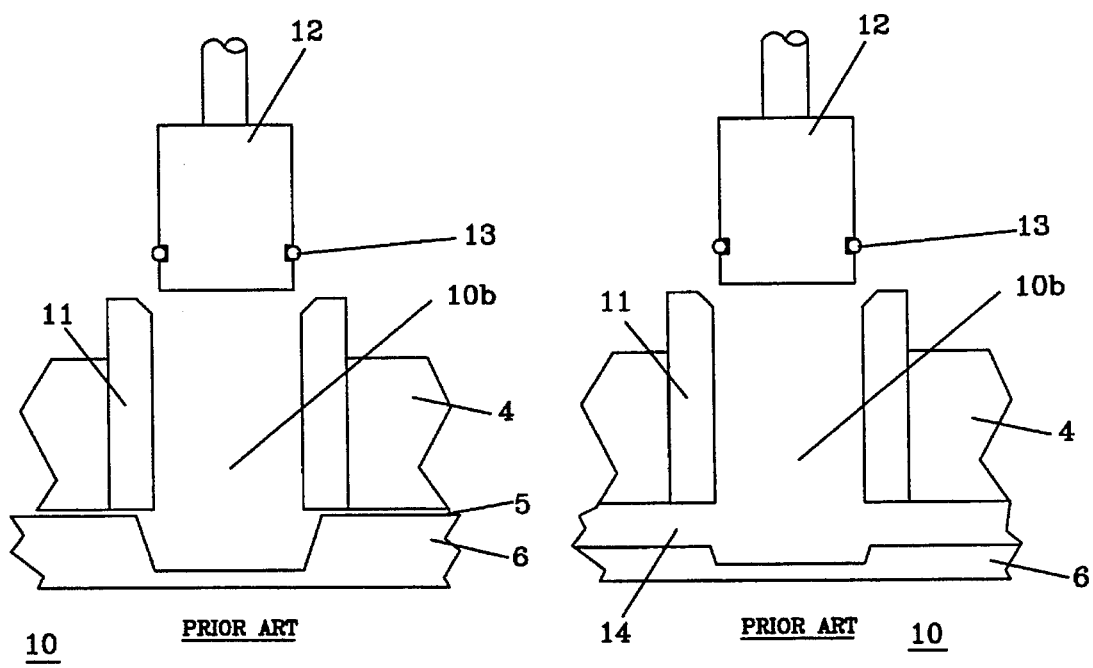
FIG. 1b is a cross-sectional view taken through section 2—2 of FIG. 1a showing the upper and lower parts of the mold.
FIG. 1c is a cross-sectional view taken through section 3—3 of FIG. 1a showing the runner connected to the mold pot.

FIG. 1b, taken through section 2—2 of FIG. 1a, shows several parts of mold 10. Mold 10 is shown with the upper mold part 4 separated from lower mold part 6 by parting line 5. Mold pot 10b is shown extending from within pot bushing 11 in the upper mold to the bottom mold 6. Plunger 12 is shown positioned above pot 10b.

FIG. 1c, taken through section 3—3 of FIG. 1a, shows upper and lower mold parts 4 and 6 clamped together with runner 14 extending from mold pot 10b.

Figure 1D:
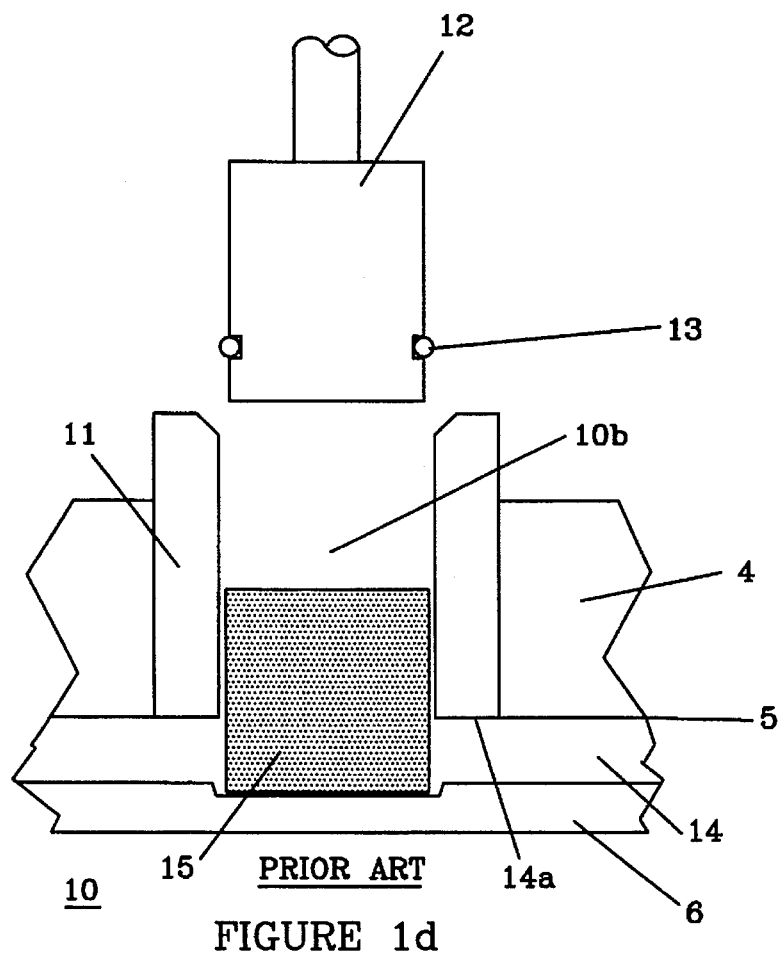
FIG. 1d illustrates a partial view of a prior art plunger, with the plunger raised and mold compound in place.

In FIG. 1d, plunger 12 is vertically above the pot 10b and pot bushing 11 and is pressed downward through the pot bushing 11 during transfer of molding compound pellet 15. Mold compound 15 is melted, with the application of heat and pressure, to a liquid state that can flow through runner 14 to mold cavities 9.

Figure 1E:
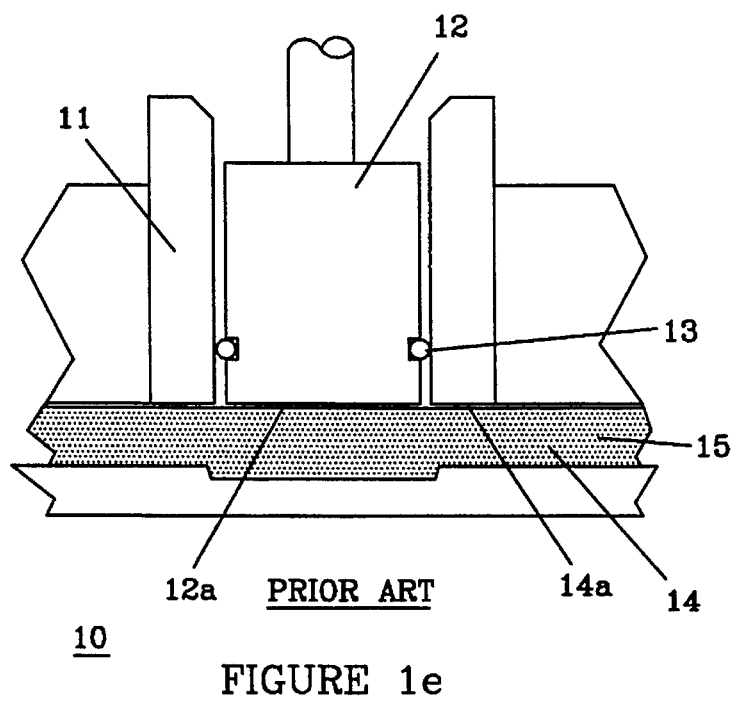
FIG. 1e illustrates the plunger of FIG. 10b lowered to move mold compound into the runner.

In FIG. 1e, mold apparatus 10 has a pot bushing 11, part of the upper mold, into which the plunger 12 is inserted to force mold compound 15 into runner 14. An O-ring 13 prevents the mold compound 15 from moving upward around plunger 12.

Plunger 12 normally does not enter the lower mold pot (lower part of mold pot 10b in lower mold part 6). The bottom side 12a of plunger 12 stops at the upper wall 14a of runner 14. In practice, plunger 12 does not enter the bottom of the pot below the upper-lower mold parting line 5 because plunger 12 would interfere with the flow pressure of mold compound into runner 14. Since plunger 12 does not enter the bottom part of pot 10b, an amount of waste mold compound is produced in the pot bottom under plunger 12. Since it is necessary to fill the runner to ensure that each mold cavity is filled and packed completely by transfer pressure from the plunger, it is not possible for the plunger to completely enter the bottom of the runner.

Figure 2A:
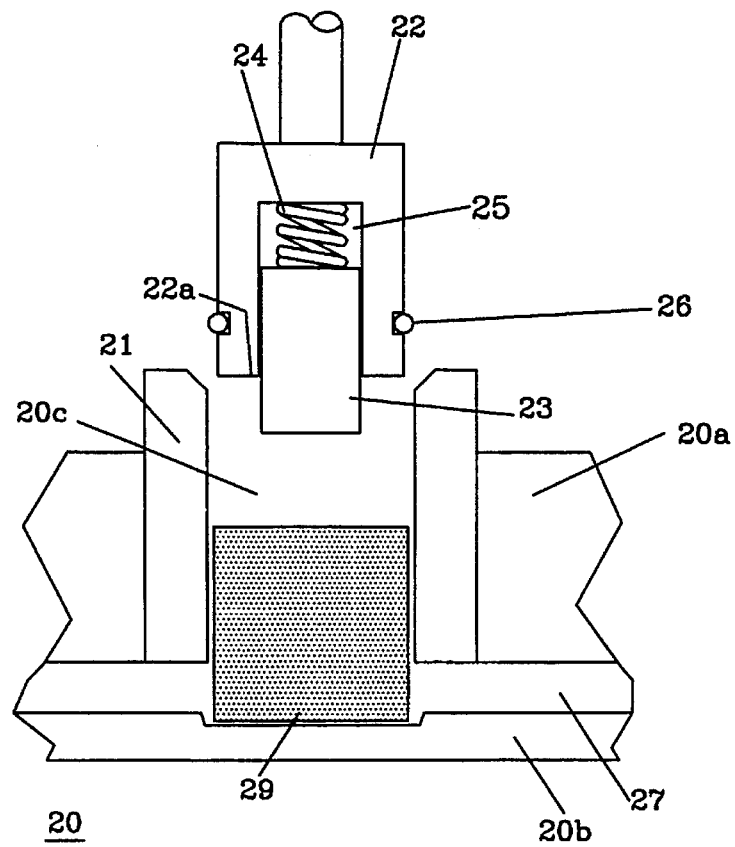
FIG. 2a illustrates a plunger according to a first embodiment of the invention which utilizes a spring biased compressible plunger piston in a bushing over a molding compound pellet.

FIG. 2a illustrates a plunger 22 according to a first embodiment of the invention that has a movable piston 23 that enters the runner 27, but at the same time not undercompressing the mold compound 29 in the mold cavities and runner. In FIG. 2a, molding apparatus 20 has a pot bushing 21, part of the upper mold 20a, into which plunger 22 is inserted to force mold compound pellet 29 into runner 27. An O-ring 26 prevents the mold compound from moving upward around plunger 22. Plunger 22 has a cavity 25 into which a piston 23 is placed. Above piston 23 is a spring 24. Pellet 29, of molding compound, is placed in the pot bushing 21 under plunger 22. As plunger 22 is moved downward into mold compound pellet 29, pellet 29, melted by heat and pressure, is moved from the pot by piston 23 and plunger end 22a into runner 27, and subsequently into the mold cavities.

Figure 2B:
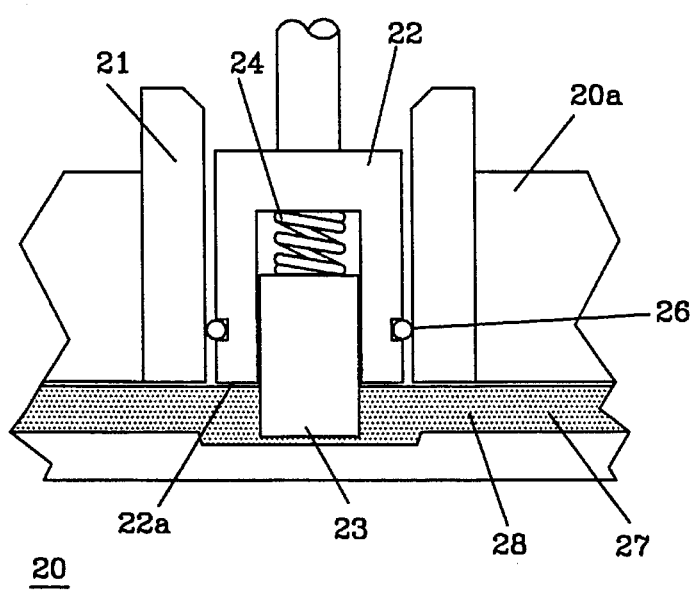
FIG. 2b shows the plunger piston of FIG. 2a moved into the mold compound runner.

Depending upon the amount of mold compound in the runner, piston 23 may move into runner 27 and stop at the bottom of runner 27, as shown in FIG. 2b. Molding compound is moved from under plunger 22 and piston 23, saving an amount of mold compound equal to the volume of piston 23 that is in runner 27.

Through the use of spring 24, sufficient pressure is applied to mold compound 29 to force it into the runners and completely fill the mold and runner cavities by transfer pressure of the plunger, but provide for the use of a lesser amount of mold compound equivalent to the volume of piston 23 that has entered the runner. This provides a saving of mold compound in the range of 5% to 15%, depending upon the number of mold cavities. Over a year production run, the amount of saving through less use of mold compound retained in the runner is considerable.

Figure 3:
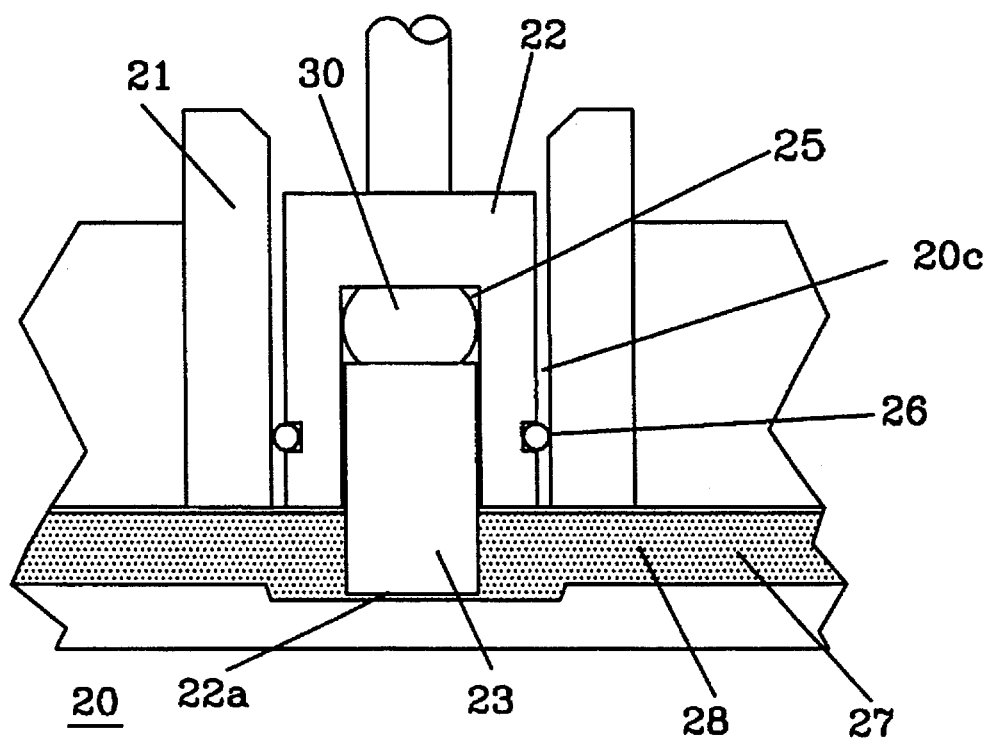
FIG. 3 illustrates a plunger according to a second embodiment of the invention which utilizes a silicon rubber ball instead of the spring of FIG. 2.

FIG. 3 illustrates a second embodiment of the invention in which the spring 24, of FIG. 2, is replaced with a ball 30 of silicon rubber. In FIG. 3, molding apparatus 20 has a pot bushing 21, forming a part of the upper mold pot 20c, into which plunger 22 is inserted to force mold compound 28 into runner 27. An O-ring 26 prevents the mold compound 28 from moving upward around plunger 22. Plunger 22 has a cavity 25 into which a piston 23 is placed. Above piston 23 is a compressible silicon rubber ball 30. As plunger 22 is moved downward, piston 23 and plunger end 22a force mold compound into runner 27, and subsequently into the mold cavities.

Depending upon the amount of mold compound in the runner, piston 23 may move into runner 27 and stop at the bottom of runner 27. If all the mold cavities and runners are filled with excess mold compound, then piston 23 may only partially move into runner 27. In either event, more mold compound is moved from under plunger 22, saving an amount of mold compound equal to the volume of piston 23 that is in runner 27.

Through the use of silicon rubber ball 30, sufficient pressure is applied to mold compound 28 to force it into the runners, and completely fill the mold and runner cavities by transfer pressure of the plunger, but provide for the use of a lesser amount of mold compound equivalent to the volume of piston 23 that has entered the runner.

In the event pressure normally applied to a plunger is not sufficient due to the use of the spring or rubber ball, then additional packing pressure can be applied through the use of appropriate transfer pressure on the plunger. Through the use of the movable piston in conjunction with a spring or compressible silicon rubber ball, the movable piston will reduce the mold compound cull when the piston is moved downward into the mold compound.

What is claimed:

1. A method for reducing molding compound waste in a molding apparatus having a molding pot, a pot bushing in said molding pot, a plunger in said bushing, and at least one runner connected to said pot bushing in said bushing, comprising the steps of:

providing a movable piston in a cavity in said plunger;

biasing the piston downward by a compressible member in said plunger; and forcing said piston into the molding compound in said at least one runner to reduce the mount of molding compound waste in said runner.

2. The method according to claim 1, wherein said compressible member is a spring.

3. The method according to claim 1, wherein said compressible member is a ball of flexible material.

4. A molding apparatus, comprising:

a molding compound pot for holding mold compound:

a bushing in said molding pot;

a runner connected to said bushing for carrying mold compound to mold cavities;

a plunger movably mounted in said bushing for forcing mold compound from said pot; and a piston mounted in said plunger, said piston movably mounted in a cavity in said plunger, wherein said piston is biased downward by a compressible member in said cavity.

5. The molding apparatus according to claim 4, wherein said compressible member is a spring.

6. The molding apparatus according to claim 4, wherein said compressible member is a flexible ball.

7. The molding apparatus according to claim 6, wherein said flexible ball is made from silicon rubber.

8. A molding apparatus, comprising:

a molding compound pot for holding mold compound;

a bushing in said molding pot;

a runner connected to said bushing for carrying mold compound to mold cavities; and a plunger movably mounted in said bushing, said plunger having a central cavity with a movable piston mounted therein, for forcing mold compound from said pot, wherein said piston is biased downward by a compressible member in said cavity.

9. The molding apparatus according to claim 8, wherein said compressible member is a spring.

10. The molding apparatus according to claim 8, wherein said compressible member is a flexible ball.

11. The molding apparatus according to claim 10, wherein said compressible flexible ball is made from silicon rubber.

\* \* \* \* \*